(12) United States Patent
Shirmohamadi

(10) Patent No.: US 7,310,948 B2
(45) Date of Patent: Dec. 25, 2007

(54) DE-ICER FOR SUSPENDED OVERHEAD LINES

(76) Inventor: Manucheher Shirmohamadi, 18637 Cavendish Dr., Castro Valley, CA (US) 94552

( * ) Notice: Subject to any disclaimer, the term of this patent is extended or adjusted under 35 U.S.C. 154(b) by 541 days.

(21) Appl. No.: 10/680,511

(22) Filed: Oct. 7, 2003

(65) Prior Publication Data

US 2004/0159453 A1   Aug. 19, 2004

Related U.S. Application Data

(60) Provisional application No. 60/417,260, filed on Oct. 9, 2002.

(51) Int. Cl.
*F01K 13/02* (2006.01)

(52) U.S. Cl. .......................... 60/646; 60/657

(58) Field of Classification Search .................. 60/645, 60/646, 657, 670
See application file for complete search history.

(56) References Cited

U.S. PATENT DOCUMENTS

| | | | | |
|---|---|---|---|---|
| 2,797,344 A | * | 6/1957 | Peirce | 307/147 |
| 3,218,384 A | * | 11/1965 | Shaw | 174/40 R |
| 3,496,567 A | * | 2/1970 | Held | 343/707 |
| 5,411,121 A | * | 5/1995 | LaForte et al. | 191/133 PM |
| 6,018,152 A | * | 1/2000 | Allaire et al. | 219/501 |
| 6,518,497 B1 | * | 2/2003 | Allaire et al. | 174/40 R |
| 6,660,934 B1 | * | 12/2003 | Nourai et al. | 174/40 R |
| 2003/0000718 A1 | * | 1/2003 | Petrenko et al. | 174/19 |

* cited by examiner

*Primary Examiner*—Hoang Nguyen
(74) *Attorney, Agent, or Firm*—Adam Warwick Bell

(57) ABSTRACT

A self-contained, line-mounted, automatic device for reducing and preventing ice deposits on a suspended line, such as a suspended overhead power line.

20 Claims, 13 Drawing Sheets

(Unit Conversion: 1 in = 25.4 mm; 1 lb = 4.45 N)

(Unit Conversion: 1 in = 25.4 mm; 1 lb = 4.45 N)

(Unit Conversion: 1 in = 25.4 mm; 1 lb. =4.45 N)

DE-ICER FOR SUSPENDED OVERHEAD LINES

This application claims the benefit of and priority from provisional U.S. application 60/417,260 filed Oct. 9, 2002.

FIELD OF INVENTION

This invention relates to removing ice deposits from suspended lines, and to preventing the formation of ice deposits on such lines.

BACKGROUND

In certain regions of the world, during winter months, ice storms can lead to the build-up of ice on the overhead transmission conductor. This ice build-up makes the conductor heavier causing it to sag more and increasing the tension in the line. In the case of a single conductor, the ice buildup can be as large as 50 mm or more in thickness. In the case of multiple conductors (conductor bundle), ice build-up is more common due to the lower operating temperature of the conductors. In this case the ice deposits can "fill" the gap between conductors, and the deposits can cover the entire conductor bundle, leading to a very large diameter, and very heavy, ice deposit. In extreme cases, the ice load can cause line breakage and/or tower failure. The North American storms of 1998, where a large number of towers failed in eastern Canada, is an example of the potential magnitude of this problem. It is important to note that this problem of icing, while specifically discussed in relation to power lines in this disclosure, is not limited to power lines, but is relevant to all suspended lines where icing can occur (e.g., support lines for towers and lines on a suspension bridge).

Ice Build-up Mechanism

Three types of ice deposits occur under different atmospheric conditions:
(1) Soft rime occurs at temperatures from −3 to −13° C. and a wind velocity from above 0 to 7 m/sec.
(2) Hard rime forms at temperatures from −2 to −9° C. and a wind velocity between 3 to 15 m/sec.
(3) Glaze occurs at temperatures above −4° C. and a wind velocity between 2 to 20 m/sec.

Soft rime is a white, opaque granular deposit of ice. It adheres poorly to conductors and occurs most often in mountainous regions. It is usually formed in supercooled fog. On the windward side, soft rime may grow to long feathery cones, or needles pointing into the wind.

Hard rime is an opaque, granular mass of ice formed by a dense supercooled fog. It is more compact and amorphous than soft rime. It adheres strongly to conductors.

Glaze (blue ice) is a coating of ice, generally clear and smooth, formed by freezing of a film of supercooled water deposited by rain, drizzle, or fog. Glaze is denser, harder, and more transparent than soft or hard rime. It adheres strongly to conductors.

Hard rime and glaze are chiefly responsible for conductor or tower failure as well as conductor galloping.

The Problem and Current Solutions

Ice buildup on high voltage power lines is recognized as a major concern by the utilities, therefore many methods to combat this problem have been devised.

A number of such devices use electrical current and impulses to clear ice from lines. The U.S. Pat. No. 4,690,353 (Haslaim) and the U.S. Pat. No. 5,411,121 (Lafort et al.) describe devices or systems using high intensity electromagnetic impulses to break the ice. In the case of Haslaim, the system is applicable to planar surfaces, and has been developed to remove the ice on the wing of an airplane. Electromagnetic pulses are injected in a thin double ribbon of copper positioned (embedded) in a rubber film. In the case of Laforte et al., the device is applicable to stranded conductors, like a stranded cable. To break the ice, electromagnetic impulses are injected in some of the insulated, integrated conductive wires in the last stranded layer of the cable. These conductive wires are insulated for this purpose during the manufacturing process of the cable. U.S. Pat. No. 6,207,939, entitled "Device And Method For De-Icing An Elongated Structural Element" (to Hydro-Qubec) describes a device that uses pairs of electrically conductive and insulated wires, through which a current is passed causing a repulsion force whose intensity is capable of breaking the ice or the frost on the line.

It appears that the majority of techniques for combating ice buildup on power lines, and many of those being developed or proposed by various research groups and utilities, are based on removing the ice from the line during or after the storm when ice has already formed on the line. Current methods are classified in four domains as (a) General applications convenient to all power lines, (b) Energized conductor applications from 2 km to 100 km, (c) Energized conductor applications shorter than 2 km, and (d) ground wire applications. Also, five type of applications have been identified as passive treatment of conductors/cables (general), active treatment of conductors/cables, internal power on bare conductors, external heat on bare conductors/cables, and external forces on bare conductors/cables.

An analysis of available and proposed approaches shows three different current solutions for combating line icing problems:

1) Reactive Category: This category applies to techniques to shed ice from the line after it has formed. Methods include use of chemical washing (using fluids which promote melting of the ice and its separation from the line), heating (by radiation or by internal or external heating sources including electrical current through the line itself or via heat tracing cable), mechanical forces (using methods to shake the line, such as explosives and hammers, methods involving devices which ride on the line and mechanically remove the ice, methods involving using a high pressure fluid spray wash, etc.), electromagnetic forces (by applying high currents to cause large attractive or repulsive magnetic field between conductors), etc. This category is, currently, the most common approach by the utilities to address ice buildup.

The available or proposed reactive methods generally require access to the line during or after a storm, require expensive equipment, are usually very labor intensive, and/or can be unsafe. Therefore, in addition to being a very expensive solution, they may be not-timely meaning that the power line could fail prior to using such methods.

2) Preventive Category: This category applies to techniques to prevent ice buildup by active or passive methods. The primary method in this category involves coatings. The coating approaches generally involve applying a chemical and/or mechanical coating on the conductor/cable to significantly reduce the bond strength between the ice and the conductor to prevent ice from building up on the line, to develop an interface between the line and the ice that can be activated to cause deicing upon current application, or to absorb radiation energy to melt the ice. There are also some proposed mechanical devices under this category, the most notable is a shape memory alloy "actuator" that provides an axial pull/push device over the line to cause deicing of a section.

The available or proposed coating preventive methods can be costly (coatings need to be reapplied), may have adverse affect on the line, or may be environmentally unsafe. The mechanical methods require extensive energy to activate and unless they have an external source (Reactive category), they only function one time during each temperature transformation (may occur only once during ice storm).

3) Risk Management Category: This category accepts the potential/risk for power line or tower failures and the subsequent power outages and addresses the impact of icing and its consequences. These are mainly economic based approaches involving risk management. However, they can help with identifying and addressing critical areas of the power grid/network where other techniques can be more beneficial.

There is clearly a need for an efficient, simple, self-contained, line-mounted, automatic device for reducing and preventing ice deposits on a suspended line.

BRIEF DESCRIPTION OF THE INVENTION

The invention is based on a simple concept of providing lateral vibration (shake) to a suspended line during an ice storm to prevent the ice from accumulating on the line and/or to remove ice deposits that have already formed. Certain embodiments of the device may be used with a single line. Other embodiments are for use with two or more parallel suspended lines placed fairly close to one another. The device is generally placed between parallel suspended lines where conventional spacers are currently placed. The invention may be considered as a new tool under Preventive Category (See "Background" above) of devices. Reviewing current tools and techniques in this category, however, it appears that none of available techniques involve vibration of a line at intervals via an automatic (passive or active system), wherein the vibration is activated only when line icing conditions are present. Furthermore, the energy requirements for the present invention, and it's low cost, makes the present invention far superior choice to the other preventive techniques.

The invention in its most general form is a device that applies a perpendicular force to the power line(s) displacing them laterally and then releasing them suddenly. The power line(s) accelerate toward their original position, then impact a part of the device that causes them to stop abruptly. The large decelerations produce forces that vibrate the lines. Furthermore, if any ice has already formed and is subsequently shed when the line is vibrated, the sudden reduction in weight will cause a vertical vibration in the span which can further shed ice on the line or contribute to the prevention of more ice buildup. The primary components of the invention are (See FIG. 9):

1. Energy gathering module which collects and converts energy from a source into usable mechanical or electrical energy.
2. Energy storage module stores either mechanical or electrical potential energy gathered by module #1 for later use (note that some embodiments of the invention do not require storage).
3. Trigger module is activated when a set of meteorological (such as temperature, moisture, wind, etc.) or line conditions (line tension, line slope, etc.) are met, and triggers the energy delivery module (#4) to deliver energy to the suspended line.
4. Energy delivery module which converts either source energy (for the embodiments of Group #1—see below) or stored mechanical or electrical energy (for the embodiments of Group #2—see below) to mechanical/kinetic energy, and delivers that energy (optionally via a linkage mechanism) to the suspended line to cause vibration.
5. Linkage/Contact assembly which links the energy delivery module to the line and transmits the kinetic energy from the energy delivery module to the power line. The linkage assembly also supports the device by attaching it to the line. The method of contact to the power line will be per acceptable utility standards.

All above modules are operatively linked together, and the device is attached to one or more suspended lines and may be activated to cause vibration in the lines.

DETAILED DESCRIPTION OF THE INVENTION

Simulation of the Effect of Ice Buildup on Transmission Lines

Figure 1:
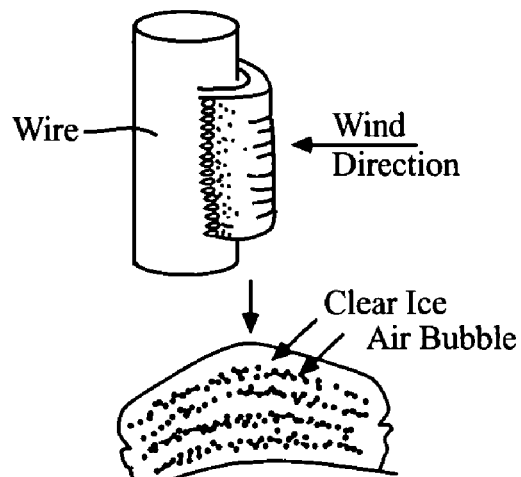
FIG. 1 Types of ice deposits
FIG. 2 Meteorological Conditions for the 3 types of ice deposits
FIG. 3 A schematic of ice-buildup on a power line
FIG. 4 Graph of line tension as a function of ice buildup
FIG. 5 Graph of line sag as a function of ice buildup
FIG. 6 Graph of tower load as a function of ice buildup
FIG. 7 Graph showing decelerations of the line from dynamic simulation.
Figure 1:
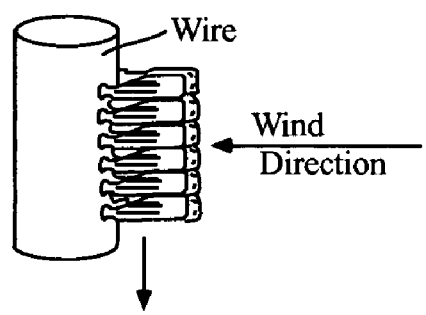
Figure 1:
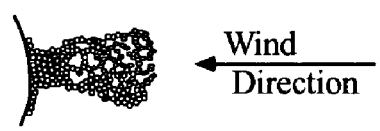
Figure 2:
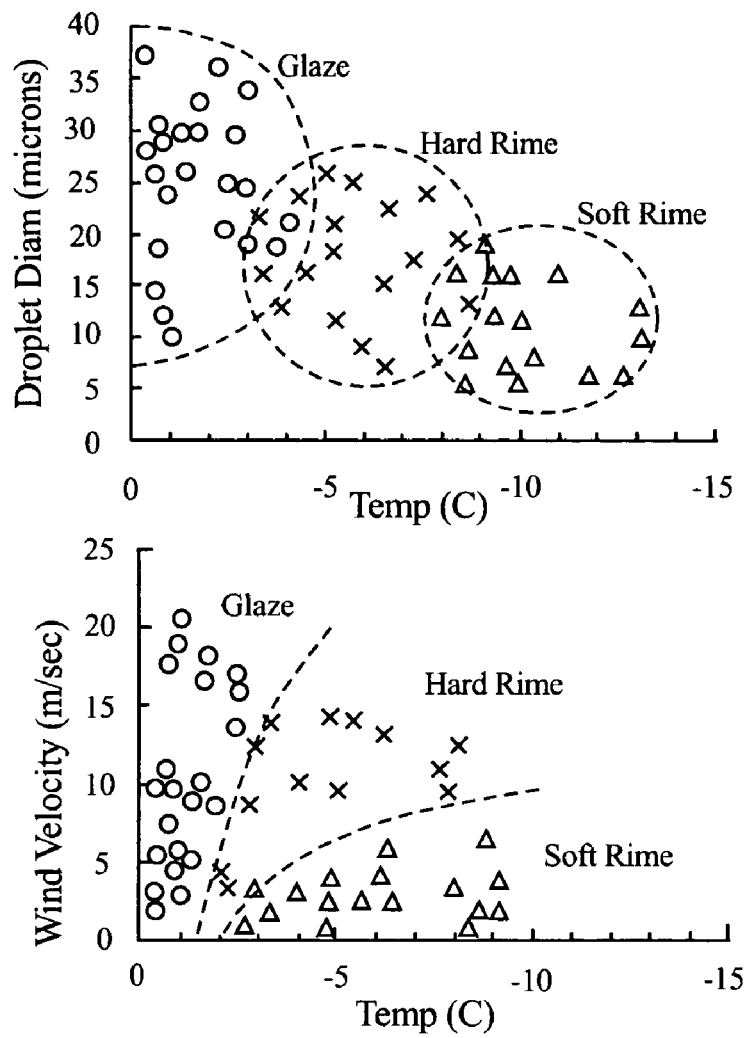
Figure 3:
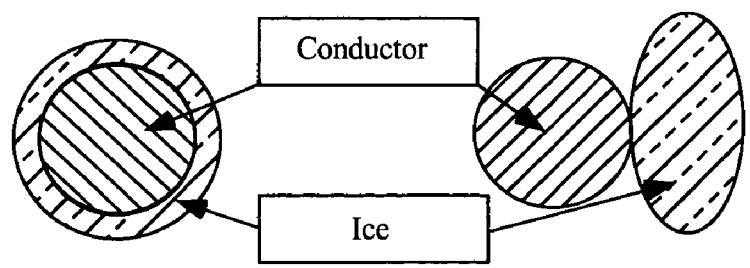

As part of the proof-of-concept experiments, the inventor modeled the effect of ice buildup on transmission lines using a simulation of a 750 foot (c. 250 meter) span single conductor. Two models for ice buildup were considered: Concentric ice build up with increasing diameter; and eccentric buildup on one side of the conductor (see FIG. 3).

Figure 4:
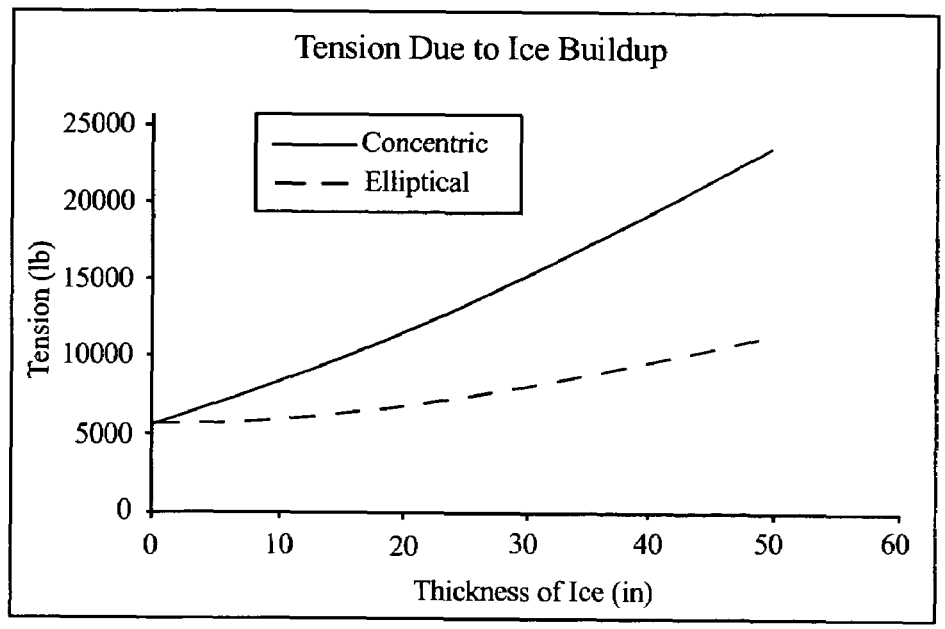
Figure 5:
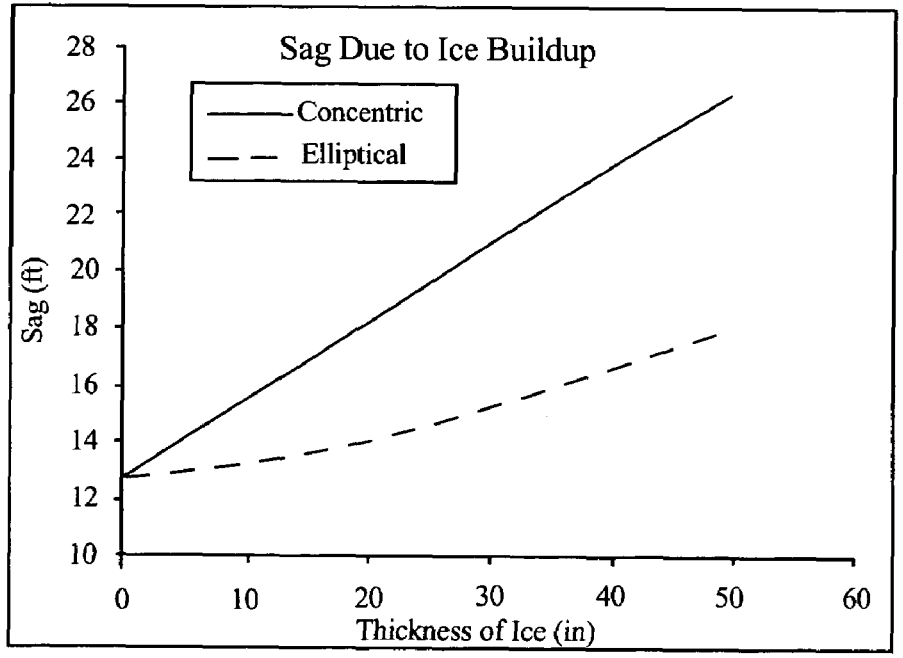
Figure 6:
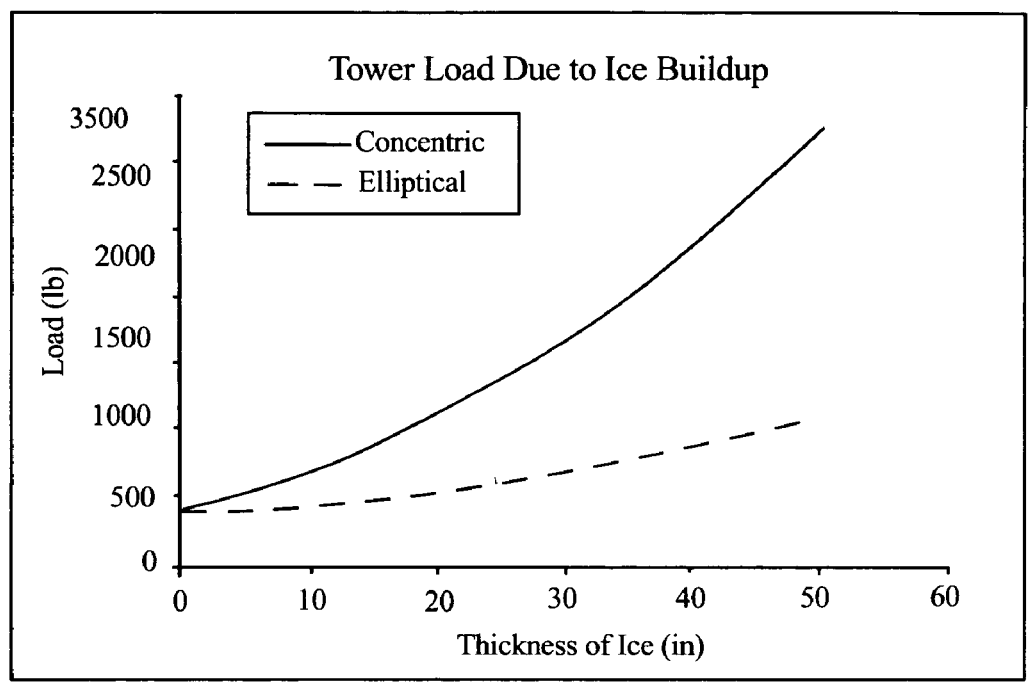

For the calculation of initial sag and line tension, the line was considered to have been designed and installed with a tension of 5,330 lbs (about 20% of ultimate breaking load) at 40° F. For the two cases considered, sag, line tension, and gravity load on towers were calculated (using closed-form catenary equations) as a function of ice thickness. For both concentric and eccentric (elliptical) ice buildup, results (see FIGS. 4, 5 and 6) demonstrated significant increases in line tension, line sag, and tower loads with increasing ice thickness. This effect is believed to be much more severe for bundled conductors where ice buildup can fill the gap between conductors. Such large ice buildup can result in substantial increases in line tension and tower loads leading to potential snapping of the conductors or buckling of the towers.

Theoretical and Experimental Testing of the De-icer Invention

In many instances, power lines are strung as a number of parallel conductors (bundled conductor) with the separation between conductors held constant by spacers attached at intervals along the line. The spacers, which lie in a plane perpendicular to the conductors also provide stability, reducing movement and swaying of the lines and preventing line contacting each other. The preferred application for the device is for use with bundled conductors where two, three or four wires run parallel to each other to carry the current. For high voltage transmission lines, the wires in a two-conductor bundle arrangement are generally about 12 inches apart. The wires in three-conductor bundle arrangement form an equal leg triangular shape with each side being about 12 inches. The wires in a four-conductor wire form a square shape with the separation of about 12 inches. The bundled conductors have spacers between them at about every 100 feet. The device may replace a certain number of spacers or be placed between existing spacers to provide its intended function of "shaking" the line at certain time intervals to prevent ice buildup on the line.

Figure 7:
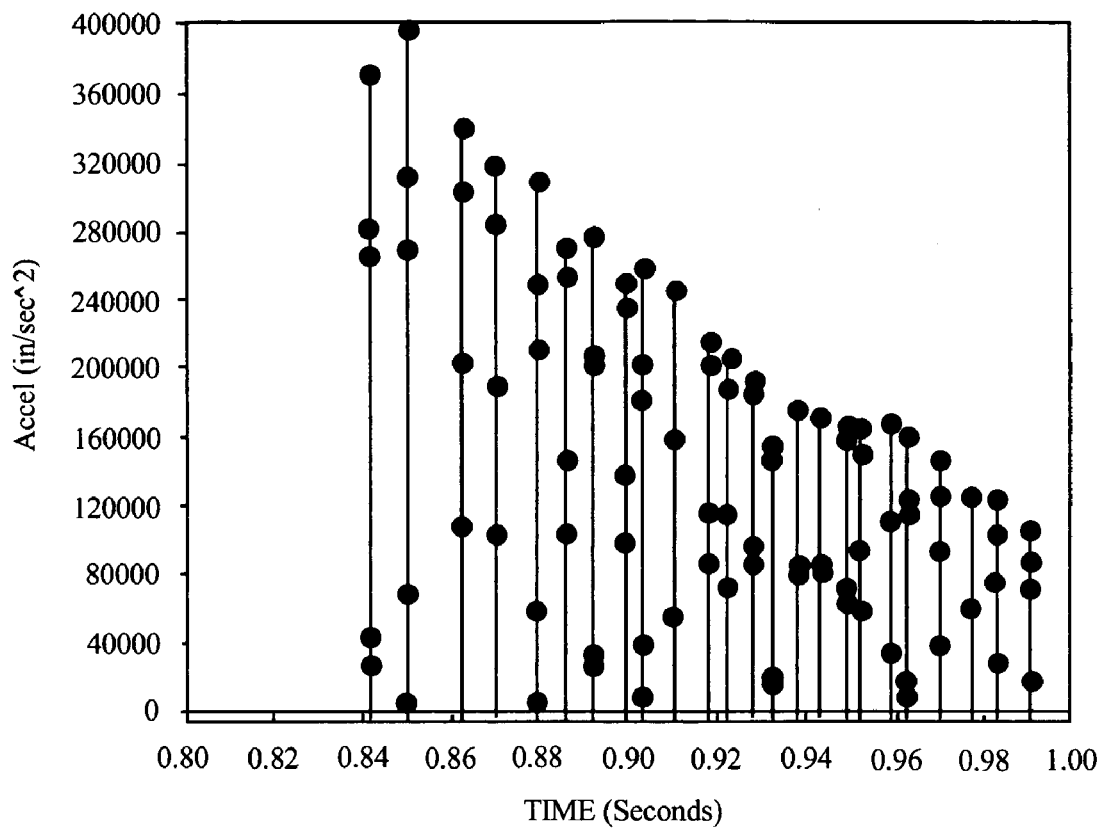

Theoretical Simulation of De-Icer Device:

To demonstrate the effect of the device action on the line, a series of dynamic simulations and vibration analyses were performed on a selected line. Two sets of simulations were performed:

First, a lateral displacement and a fast release between two parallel cables were simulated. Various initial movements, damping, and release rates were considered. Results of these simulations (see FIG. 7) show very large accelerations (and hence forces) that are generated in the line that can lead to ice shedding. The resulting accelerations are believed to be sufficient to prevent ice buildup by ice-shedding. Second, the effect of the ice-shedding on the line span was simulated. This effect is similar to a large sag change in a short time. These dynamic simulations showed large vertical movements and accelerations (hence forces) in the line which can cause more ice-shedding. Therefore, it is our conclusion that by placing these devices at strategic locations on each span, the ice buildup can be prevented.

Figure 8:
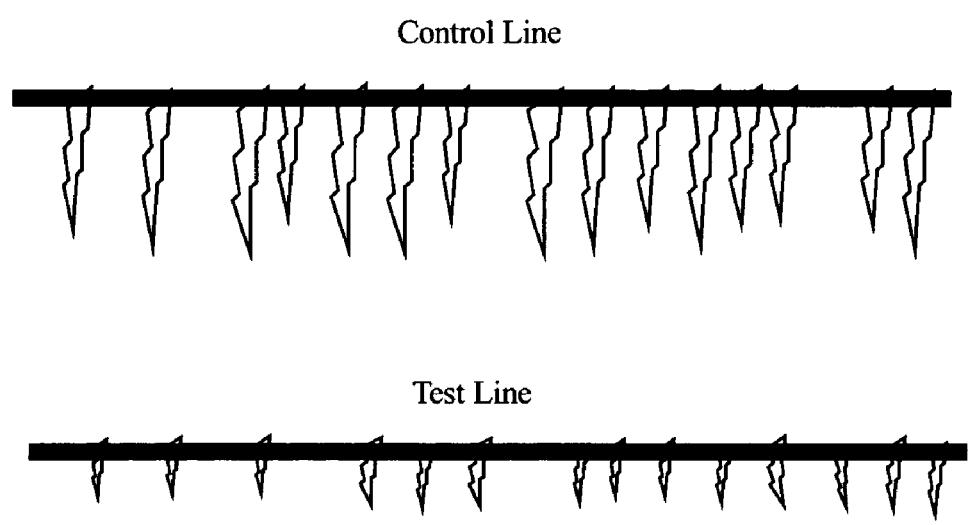
FIG. 8 discloses the control line and test line during the experimental testing of the de-icing device.

Experimental Testing of De-Icer Device:

A second experiment, "mockup testing," was conducted to demonstrate the effect of the deicing mechanism. Two metallic parallel cables, each about 6 foot long, were strung horizontally in a freezer under tension. Freezing rain was generated by spraying supercooled water on both cables (see FIG. 8) using a pressurized nozzle system. In one test, both cables were sprayed without any line vibration to show that icing occurs equally on both cables. In the second test both lines were sprayed the same way as the first test. In this test the "control" cable remained stationary throughout the test, while the "test" cable was intermittently vibrated by displacing its midpoint then releasing it. Tension in the cable would pull the cable straight, causing it to impact a metal stop. The force of impact vibrated the test cable. Ice buildup was notably less on the cable undergoing intermittent vibration. This test (FIG. 8) successfully demonstrated the proposed deicing mechanism.

Components and Various Embodiments of the Invention

Figure 9:
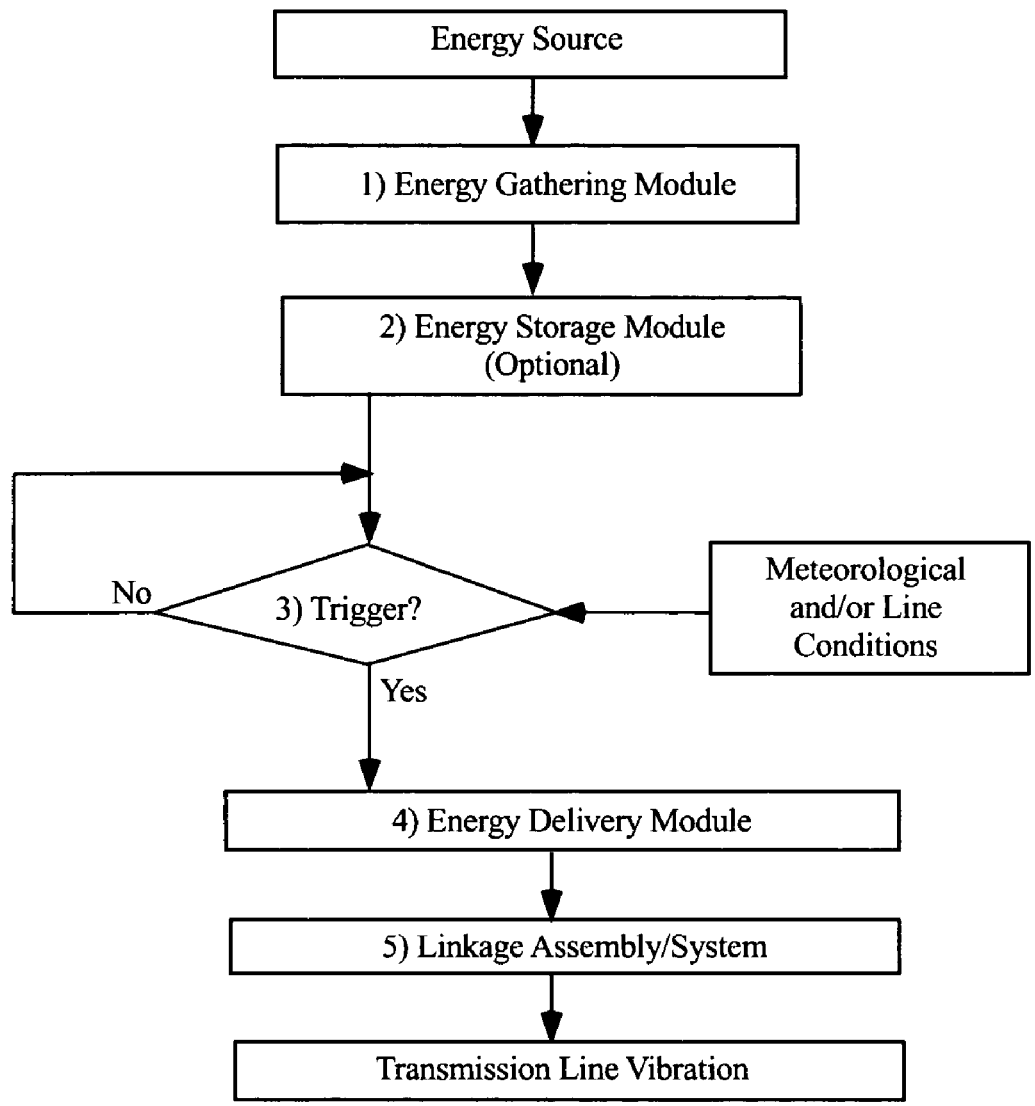
FIG. 9 Block diagram of de-icer device showing its five main modules
FIG. 10 Block diagram showing the modules and components of the de-icer device
FIG. 11 General schematic of de-icer device and its five main modules
FIG. 12 An embodiment of the de-icer device for Group #1
FIG. 13 An embodiment of de-icer device for Group #1
FIG. 14 An embodiment of the de-icer device for Group #1
FIG. 15 An embodiment of de-icer device for Group #1
FIG. 16 An embodiment of the de-icer device for Group #2
FIGS. 17A, 17B, 17C An embodiment of de-icer device for Group #2

FIG. 9 is a block diagram showing the components of the device, in a general embodiment. The components ("modules") are: energy gathering module, energy storage module, trigger mechanism, energy delivery module, and linkage assembly.

Figure 10:
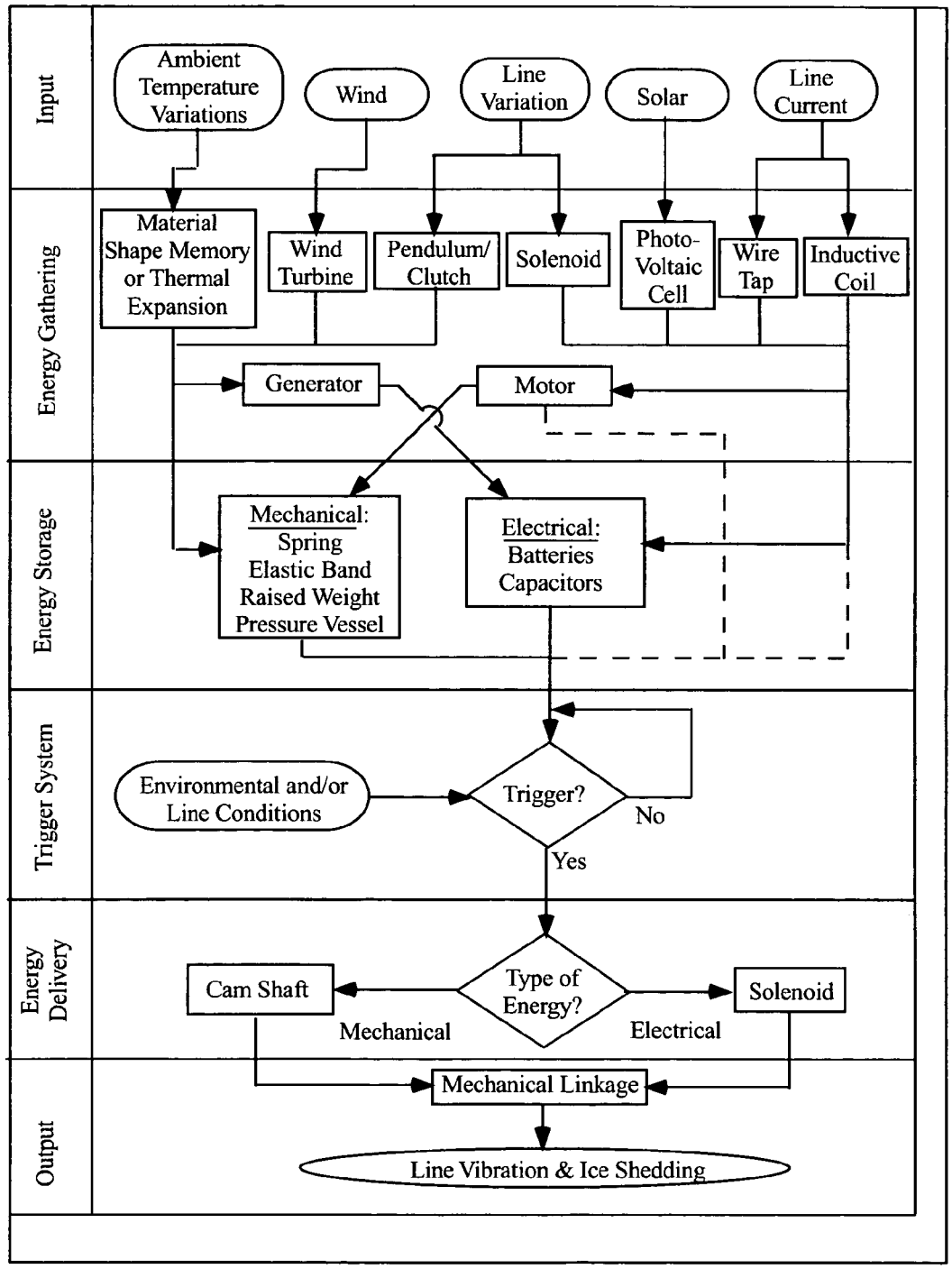

The purpose and function of each module of the device is described below, and further described in FIG. 10.

1. Energy gathering module collects and converts energy from a source into usable mechanical or electrical energy. The energy gathering module may be, but is not limited to:
   a wind driven turbine that transforms kinetic wind energy into rotary motion of a shaft though a system of gears,
   a pendulum attached to a backstopping clutch and a gear (similar to a self winding watch mechanism) that transforms line Aeolian vibration to circular motion of a shaft,
   a shape memory alloy (SMA) actuator which transforms ambient temperature variations into motion, e.g., a circular motion of a shaft (e.g., a SMA may be linked to a spring or gear/cog mechanism such that the expansion and/or contraction of the SMA causes, for example, a spring to become wound, thus storing potential energy in the spring, which may be subsequently released).
   a solenoid which transfers line Aeolian vibration into electricity, e.g. a magnet inside a conductive coil such that as line vibrates with wind (Aeolian vibration), the magnet moves back and forth inside the coil causing electricity to be generated.
   a photovoltaic cell which transfers sun radiation into electric energy (which then can be used immediately to produce vibration or stored in a battery and later converted to kinetic energy via a motor),
   a direct wire tap to the power line that pulls power from the line directly, or
   an inductive coil wrapped around the power line to gather electrical energy.

In the energy gathering module, the kinetic energy of motion (e.g., rotary) or the electricity obtained from the source can be inter-converted using a generator or a motor. The energy may be transferred to the energy storage module via a gear system, a shaft, a linkage system, electrical wires, or other means.

2. Energy storage module stores either mechanical or electrical potential energy gathered by module #1 for later use (note that some embodiments of the invention do not require storage). The energy storage module may be, but is not limited to:
   one or more of the many of elastic storage devices such as helical, leaf, or torsion springs or an elastic band for mechanical energy storage,
   a raised weight for mechanical energy storage,
   a pressurized fluid accumulator for mechanical energy storage,
   a system of batteries for electrical energy storage, or
   a system of capacitors for electrical energy storage.

3. Trigger module which signals the invention to activate the energy delivery module (#4) when a set of meteorological conditions (such as temperature, moisture, wind velocity, etc.) or line conditions (line tension, line slope, etc.) are met. The trigger mechanism may contain the sensory apparatus to determine if such triggering conditions are met. Alternatively, the trigger mechanism may be triggered remotely, wherein a signal is transmitted to the trigger module when certain conditions are met. For example, meteorological conditions may be measured at another site (such as by satellite or remote weather station) and a wireless signal may be send to trigger the device. Or remote telemetry may be used to monitor the conditions at the line, and when appropriate, a signal may be sent to activate the device. The trigger module may be, but is not limited to:
- a bimetallic strip which undergoes a set motion with temperature change,
- a Shape Memory Alloy (SMA) actuator which undergoes a set motion with temperature change,
- a container/cantilever assembly which undergoes a set motion when the container is filled with rain water or ice, or
- a weight/slide assembly in which the weight moves over the slide as the slope of the power line is changed.

The trigger module acts as a "switch" which activates the energy delivery module (#4) to transfer the mechanical or electrical energy to force/displacement to be applied to the power line.

4. Energy delivery module which converts either source energy (for Group #1) or stored mechanical or electrical energy (for Group #2) to mechanical force/displacement. The energy delivery module may be, but is not limited to:
- a cam shaft which converts circular motion into a linear force/motion, or
- a solenoid which converts electricity to a linear force/motion.

The linear motion is transferred to the power line via linkage/contact module (#5) to pull the lines together or separate them and release them in a sudden fashion, causing vibration.

5. Linkage/Contact assembly which transmits the linear force/motion generated by the energy delivery module (#2) to the power line. This system may also attach the device to the line. The method of contact with the power line will be per acceptable utility standards and is a matter of utility design choice.

Embodiments With and Without an Energy Storage Module

The invention has two general groups of embodiments:

Group #1 embodiments: This group of devices is the simplest form of the de-icer device and applies to the conditions wherein electrical power in the power lines will be available during an ice storm. In this group, energy storage (module #2) is not required. Upon the activation of the trigger mechanism (module #3), the available electrical energy from the line is converted to mechanical force/displacement (module #4) and transmitted to the line (module #5). The embodiments of Group #1 can simply consist of an inductive coil or a wire tap to the power line and through a simple switch which is activated by a temperature and/or moisture sensor, such as a bimetallic strip or a shape memory alloy actuator (module 3), powers a solenoid that applies force to the power line (modules #4 & #5) to pull them inward or push them apart and then releasing them.

Group #2 embodiments: This group of devices applies to the conditions wherein no electrical power in the power lines is available during the ice storm. The main difference between Group #2 and Group #1 is the presence of the energy storage module (module #2) in which mechanical or electrical energy is stored and is available to activate the delivery module upon trigger conditions.

Figure 11:
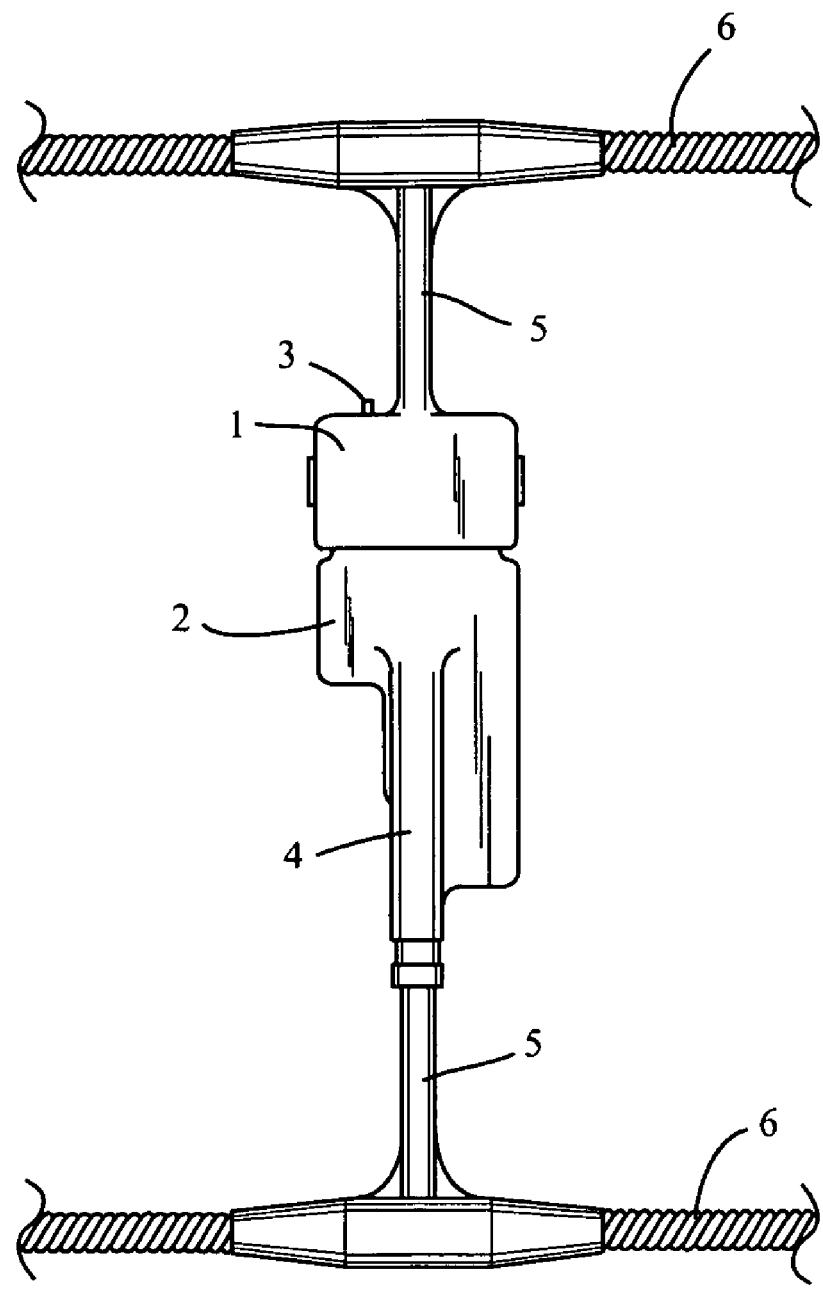

Various embodiments of the de-icer device are shown in the figures and include:

FIG. 11: An energy gathering module 1 collects and converts energy from a source into usable mechanical or electrical energy. An energy storage module 2 stores either mechanical or electrical potential energy gathered by energy gathering module 1 for later use. Some embodiments of the invention do not require storage. A trigger system 3 signals the invention to activate the energy delivery module 4 when a set of meteorological (such as temperature, moisture, wind, etc.) or line conditions (line tension, line slope, etc.) are met. An energy delivery module 4 converts either source energy (for Group #1) or stored mechanical or electrical energy (for Group #2) to mechanical force/displacement. The linkage/contact assembly 5 transmits the linear force/motion generated by the energy delivery module 2 to the suspended conductor 6 which is used for electric power transmission or distribution. The linkage/contact assembly 5 also supports the device from the conductor. The method of contact to the conductor will be per acceptable utility standards.

Figure 12:
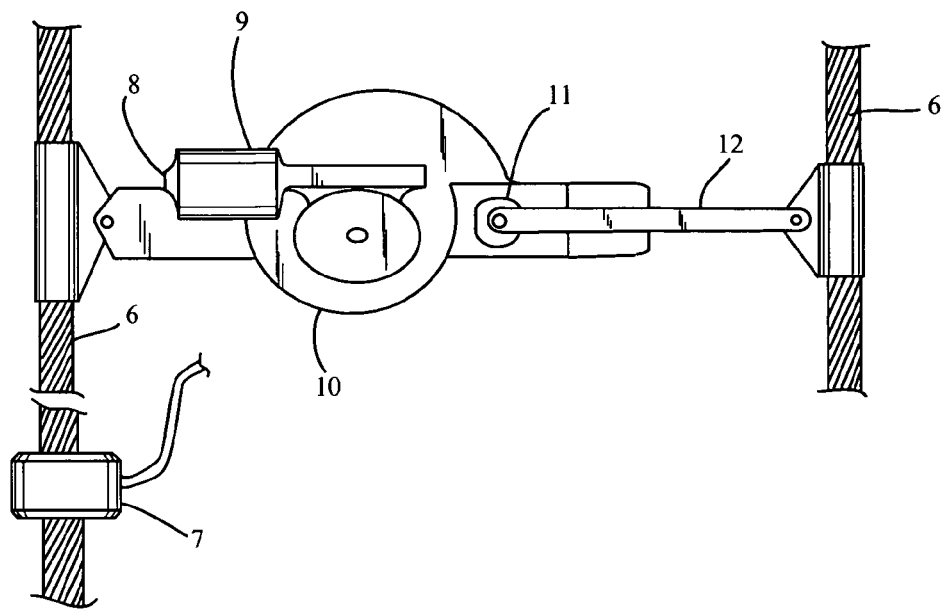

FIG. 12: Power transformer 7, composed of a toroidal coil, provides stepped down current to the device. Trigger mechanisms 8 resides in the electrical path between the power transformer 7 and the gear motor 9. When meteorological and/or line conditions are met, current is connected to the gear motor. The motor is geared such that the angular velocity of the motor is reduced and its torque is increased in such a way that the motor has sufficient power to displace conductors 6 at the appropriate time interval. Cam 10 converts the circular motion of the gear motor to linear displacement of the conductors. The leading edge of the cam lobe has a gradual increase in radius. After its apex the cam lobe has an abrupt decrease in radius. Cam follower 11, composed of a roller or a sliding element, rides on the surface of cam 10 and provides a low friction, low wear interface to a linkage assembly 12. Linkage assembly 12 connects to the cam follower and makes contact with conductors 6. As the gradual rise of the cam lobe moves beneath the cam follower, the linkage assembly forces the conductors apart. As the cam follower moves past the apex of the cam, the conductors suddenly move back towards each other, then stop abruptly, creating a vibration in the conductors.

Figure 13:
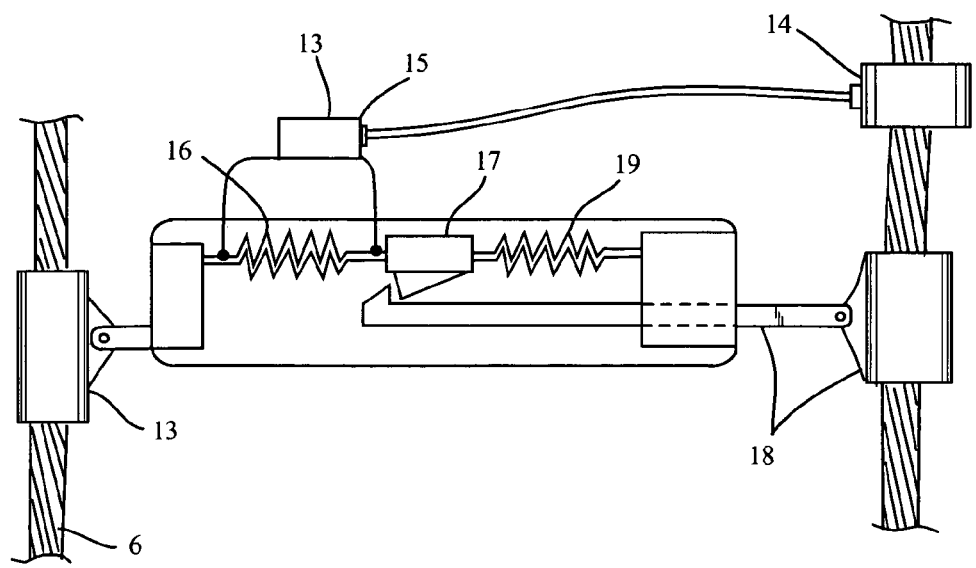

FIG. 13: Heat controller13 receives current from power transformer 14 when trigger mechanism 15 completes the electric circuit. A shape memory alloy actuator 16 contracts/expands when heated via a current supplied by heat controller 13. A latch 17 is displaced by the shape memory alloy actuator 16, moving the linkage assembly 18, and displacing conductors 6. At a certain displacement, latch 17 releases the linkage assembly and tension in the conductors sends them back to their original positions. The linkage assembly 18 hits a hard stop which causes a vibration in the line. A return spring 19 pulls/pushes the latch back into contact with linkage assembly 18 as shape memory alloy actuator 16 cools.

Figure 14:
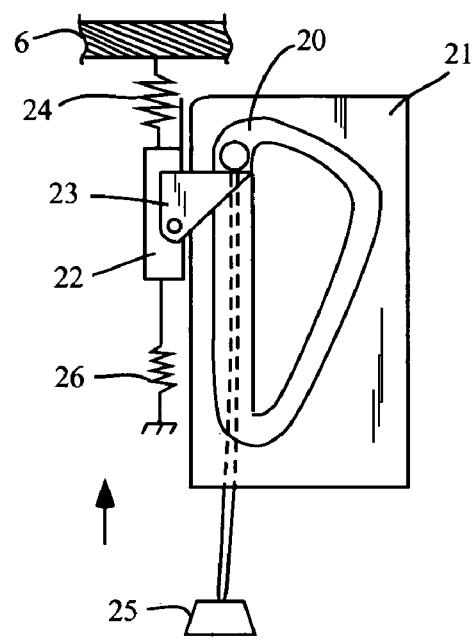

FIG. 14: A pin 20 is constrained to move within the track of a plate 21. A slider 22 can move vertically. When a hinged latch 23 makes contact with the pin 20, electrical current is transmitted through a shape memory alloy actuator 24, causing it to contract. This lifts pin 20, to which is attached a weight 25. When the pin reaches the top of the track, pin 20 travels to the right, released from the latch 23. This causes the weight 25 to drop suddenly. Current through the actuator 24 is cut off. A spring 26 extends the actuator 24 as the actuator cools. When the latch 23 returns to the bottom of the track and passes below pin 20, current to the actuator 24 is restored and the pin 20 and weight 25 are lifted again.

Figure 15:
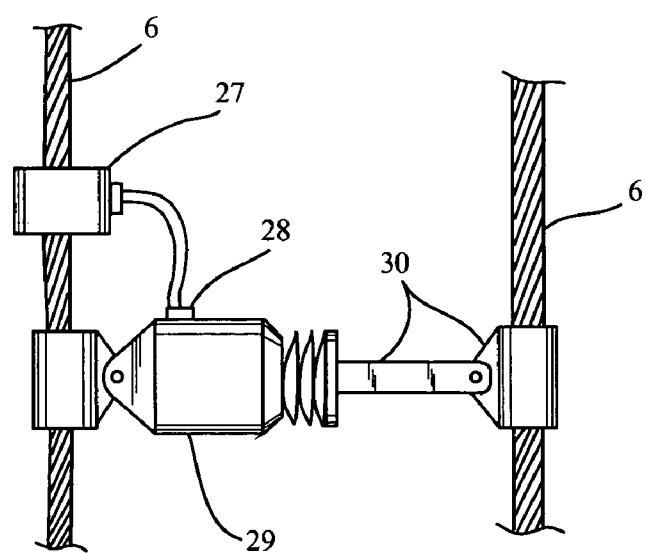

FIG. 15: A toriodal power transformer 27 provides stepped down current from the conductor 6 to the device. When certain meteorological and/or line conditions are met, a trigger mechanism 28 completes the circuit and power is provided to a solenoid 29. When energized, the solenoid 29 abruptly extends the linkage assembly 30, causing a vibration in the conductor 6, and opening the circuit providing power to the solenoid. The linkage assembly 30 gradually returns to its original position. If meteorological and/or line conditions are still met, the solenoid 29 will be energized again.

Figure 16:
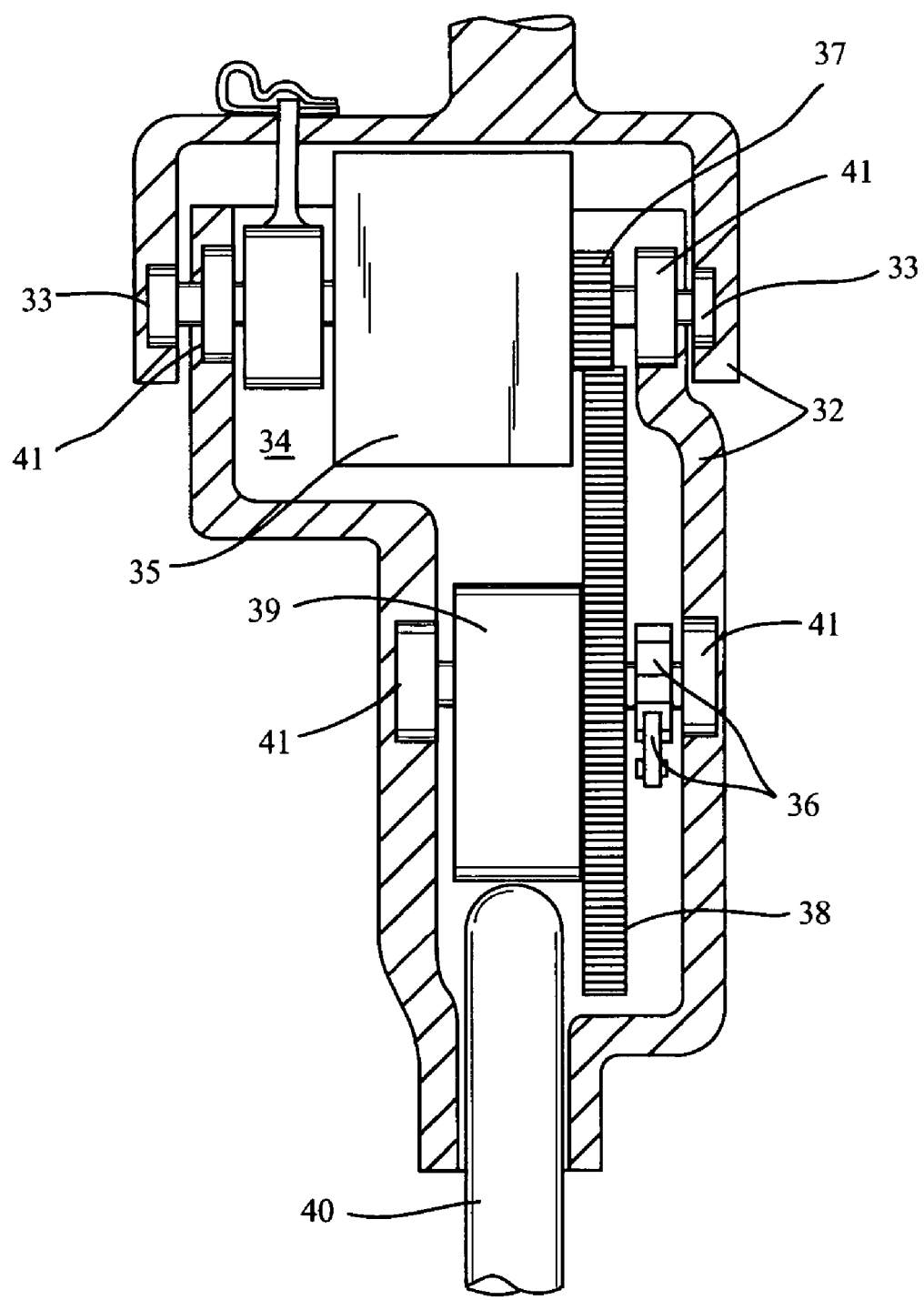

FIG. 16: Vibration of the conductors 6 causes the two part body 32 to oscillate about the bearings 33. This motion causes an indexing clutch 34 to wind up a power spring 35. When certain meteorological and/or line conditions are met, pawl 36 is retracted, allowing gear 37 to drive gear 38. Cam 39 turns with gear 38, and causes the linkage assembly 40 to extend, spreading the conductors 6 apart. When the linkage assembly 40 passes the apex of cam 39, tension in the conductors 6 cause the conductors to move toward their original position. This motion is abruptly halted when linkage assembly 40 contacts the smallest radius portion of cam 39. The sudden stop vibrates the conductors. Backstopping clutches 41 prevent the power spring 35 from unwinding.

Figure 17A:
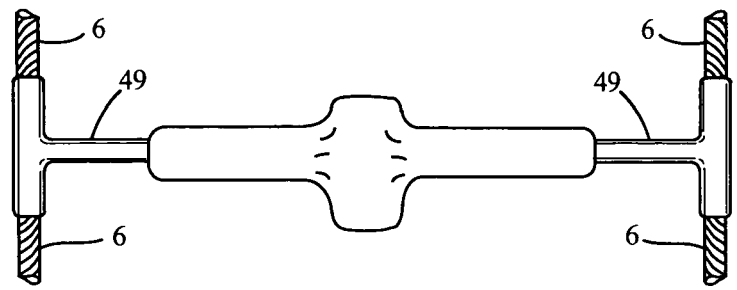
Figure 17B:
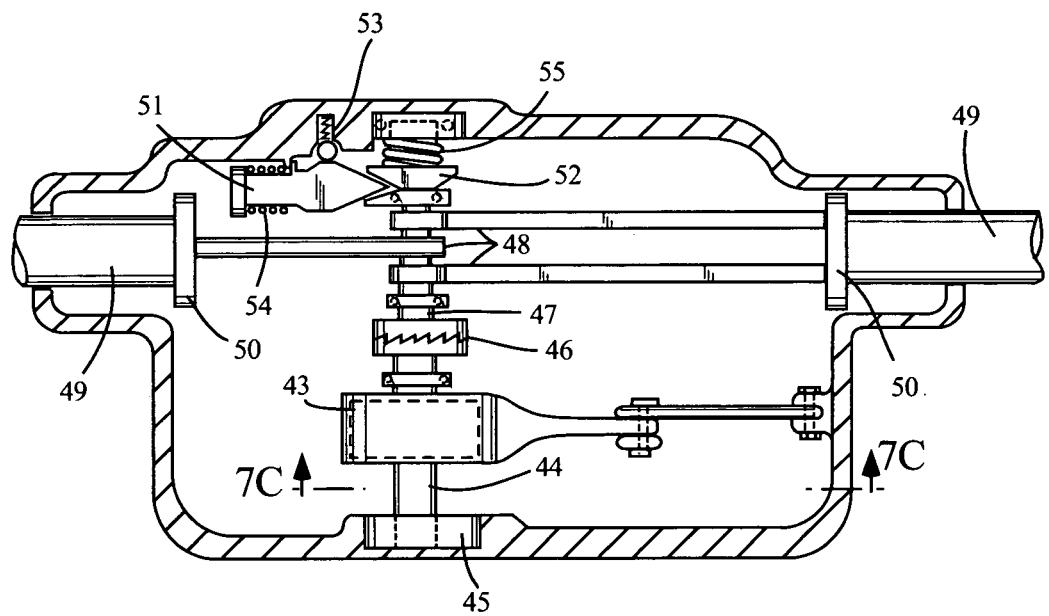
Figure 17C:
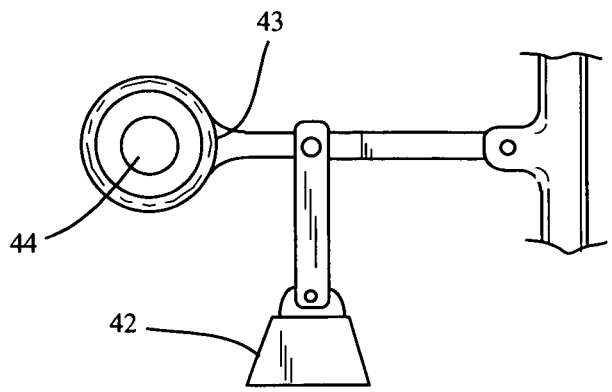

FIG. 17: Vibration of the conductors 6 causes a weight 42 to bounce up and down. This causes a rotation of an indexing clutch 43 which rotates shaft 44. Backstopping clutches 45 in the housing 46 allow shaft 44 to rotate only one direction. Clutch 46 couples shaft 47 to shaft 44. As shaft 47 rotates, torsion springs 48 are wound up, pulling in the linkage assemblies 49. This decreases the spacing between the conductors 6. When certain meteorological and/or line conditions are met, a trigger mechanism (not pictured) allows the wide portion 50 of the linkage assembly to push on the end of pin 51 which engages a decoupling device 52, pulling the clutch 46 apart, allowing shaft 47 to turn independently of shaft 44. A detent ball 53, holds pin 51 in place. Tension in the conductors 6, pull on the linkage assemblies 49 and unwinds the torsion springs 48. When the wide portion 50 of the linkage assembly contacts the housing 46, motion of the conductors 6 stops abruptly causing the line to vibrate. The impact also shakes loose the detent ball 53, allowing return spring 54 to pull pin 51 back. This allows return spring 55 to re-engage clutch 46, and the cycle repeats.

Design Factors

Various factors may be taken into account when choosing design elements of the invention. Some of these factors are as follows:

General characteristics of the device: The device will fit in the same space as the exiting spacers for bundled-conductors. It will connect to the power lines using standard and customary spacer contact methods. Its weight will be similar to existing spacer so it won't cause additional line tension.

Location of devices: These devices will be installed at strategic locations on critical lines either replacing some of the existing spacers or be placed between such spacers. The number of devices for each span will depend on the span's dynamic characteristics. We expect one to three such devices would be sufficient for each critical span.

Activation of the device: The device will be activated when a specified range of meteorological and/or loading conditions has been reached. These will include ambient temperatures, wind speed, and ice loading. The device continues its actuation for as long as the adverse conditions for ice buildup exist.

Motion provided by the device: The motion and the subsequent release provided by the device on the lines will be established to provide an optimum (ratio of line accelerations over energy input) vibration of the span. Preliminary dynamic simulations shows small movements can cause very large accelerations and hence can prevent the ice buildup.

Energy storage and delivery of the device: Some embodiments of the device may need to be functional when there is no power in the line. Therefore, it should store the required energy in a passive mechanical system and will deliver it to the line when the adverse conditions are met. The initial energy to be stored in the device may be either mechanical (from line vibration, wind forces, etc.) or electrical (from line current).

Energy storage requirements: Based on the small lateral stiffness of conductors, a very small force is needed to cause large deflections. Therefore, the energy needed for each actuation is quite small. Given an interval between actuation of 5 to 30 minutes, and considering the normal duration of such storms (less than 48 hours), the overall required energy storage is still small. The device will deliver energy to the line for the duration that depends on the duration of the storms. Time to store the required energy into the device (from mechanical or electrical sources) will be designed such that the device will always have ample energy to overcome a long storm.

Installation: Except under exceptional conditions, live line procedures, similar to installation of spacers, will be used to install the device.

Monitoring and Maintenance: The device will be virtually maintenance free. The same frequency used for monitoring and maintaining other active line devices such as circuit breakers and switches will be used here. Maintenance activities to be performed will be using live line methods.

Others: Additional requirements and design alternatives will be clear to one of skill in the art.

It is important to note that the present invention, while specifically discussed in relation to power lines in this disclosure, is not limited to power lines, but is relevant to all suspended lines where icing can occur (e.g., support lines for towers and lines on a suspension bridge). When the term "line" is used in the disclosure or the claims, it is expressly stated that the term is not meant to be limited to power lines, but applies to any line.

The embodiments described herein are exemplary only, and one of skill in the art will readily see that many variations of such embodiments can be made without deviating from the spirit of the invention. The materials used and the precise dimensions of the device and the selection of components is well within the routine skill of one of skill in the art (with the assistance of the present disclosure). Therefore these design choices will not be discussed in detail herein.

The invention claimed is:

1. For reducing and preventing ice deposits on a suspended line, a device that applies a perpendicular force to the power line displacing it laterally and then releasing the line suddenly, providing lateral vibration to the suspended line, the device comprising: an energy gathering module operatively connected to an energy storage module, wherein the energy storage module is operatively connected via a trigger mechanism to an energy delivery module, wherein the energy delivery module is further connected to one or more suspended lines, and wherein the device may be activated via the trigger mechanism to cause energy to be transferred from the energy delivery module to the suspended line so as to cause motion in the line, thus reducing and preventing ice deposits.

2. The device of claim 1 wherein the energy gathering module is adapted to gather energy from a non-electrical energy source.

3. The device of claim 1 wherein the energy gathering module comprises a wind driven turbine.

4. The device of claim 1 wherein the energy gathering module comprises a shape memory alloy actuator.

5. The device of claim 1 wherein the energy gathering module comprises a pendulum and with a clutch/gear assembly.

6. The device of claim 1 wherein the energy gathering module comprises a solenoid.

7. The device of claim 1 wherein the energy gathering module comprises a photovoltaic cell.

8. The device of claim 1 wherein the energy gathering module comprises a direct wire tap to a power line.

9. The device of claim 1 wherein the energy gathering module comprises an inductive coil wrapped around a power line.

10. The device of claim 1 wherein the energy storage module comprises an elastic storage device.

11. The device of claim 10 wherein the elastic storage device comprises one or more springs.

12. The device of claim 1 wherein the energy storage module comprises a raised weight.

13. The device of claim 1 wherein the energy storage module comprises a pressurized vessel.

14. The device of claim 1 wherein the energy storage module comprises a battery.

15. The device of claim 1 wherein the energy storage module comprises a capacitor.

16. The device of claim 1 wherein the trigger mechanism is triggered by meteorological conditions.

17. The device of claim 1 wherein the trigger mechanism is triggered by line conditions.

18. The device of claim 1 wherein the trigger mechanism is triggered remotely.

19. The device of claim 1 wherein the trigger mechanism is selected from the group consisting of: a bimetallic strip, a shape memory alloy actuator, a container/cantilever system, and a weight/slide system.

20. The device of claim 1 wherein the energy delivery module is selected from the group consisting of: a cam shaft and a solenoid.

* * * * *